(12) United States Patent  (10) Patent No.: US 8,895,645 B2
Rademacher et al.  (45) Date of Patent: Nov. 25, 2014

(54) POLYMER-MODIFIED ASPHALT COMPOSITIONS

(71) Applicants: Firestone Polymers, LLC, Akron, OH (US); Heritage Research Group, Indianapolis, IN (US)

(72) Inventors: Christine Rademacher, Akron, OH (US); Timothy Reece, Indianapolis, IN (US); Herb Wissel, Indianapolis, IN (US); Daniel Graves, Canal Fulton, OH (US); Peter Boerner, Massillon, OH (US)

(73) Assignees: Firestone Polymers, LLC, Akron, OH (US); Heritage Research Group, Indianapolis, IN (US)

( * ) Notice: Subject to any disclaimer, the term of this patent is extended or adjusted under 35 U.S.C. 154(b) by 0 days.

(21) Appl. No.: 14/075,444

(22) Filed: Nov. 8, 2013

(65) Prior Publication Data

US 2014/0066549 A1 Mar. 6, 2014

Related U.S. Application Data

(63) Continuation of application No. 12/596,649, filed as application No. PCT/US2008/005123 on Apr. 18, 2008, now Pat. No. 8,580,874.

(60) Provisional application No. 60/925,463, filed on Apr. 20, 2007.

(51) Int. Cl.
  *C08F 297/04* (2006.01)
  *C08L 95/00* (2006.01)
  *C08L 53/00* (2006.01)
  *E01C 1/00* (2006.01)
  *C08L 9/06* (2006.01)

(52) U.S. Cl.
  CPC .............. *C08L 95/00* (2013.01); *C08F 297/04* (2013.01); *C08L 9/06* (2013.01); *Y10S 525/901* (2013.01)

USPC ................ 524/68; 524/505; 525/70; 525/71; 525/88; 525/95; 525/901

(58) Field of Classification Search
  CPC ... C08L 95/00; C08L 95/005; C08L 2666/74; C08L 53/00; C08K 3/0016; C08K 3/16; C08K 3/34; C08K 5/00; C08F 297/04; E01C 1/00
  USPC ............. 524/68, 505; 525/70, 71, 88, 95, 901
  See application file for complete search history.

(56) References Cited

U.S. PATENT DOCUMENTS

| | | | |
|---|---|---|---|
| 4,874,821 A | | 10/1989 | Agostinis et al. |
| 5,718,752 A | * | 2/1998 | Kluttz .......................... 106/273.1 |
| 6,998,446 B2 | | 2/2006 | Baik et al. |
| 7,923,391 B2 | | 4/2011 | Thomas |
| 2002/0128355 A1 | * | 9/2002 | Wollum et al. .................. 524/59 |
| 2006/0211818 A1 | * | 9/2006 | Kurimura et al. ............... 525/88 |

FOREIGN PATENT DOCUMENTS

EP 143738404 * 4/2011

* cited by examiner

*Primary Examiner* — James J Seidleck
*Assistant Examiner* — Deve E Valdez
(74) *Attorney, Agent, or Firm* — Meredith E. Hooker; Arthur M. Reginelli

(57) ABSTRACT

A modified-asphalt composition prepared by introducing a diene end-capped block copolymer with a molten asphalt composition, where the block copolymer is defined by the formula $$\alpha\text{-}(D\text{-}V\text{-}d)_x$$

where each D is independently a polydiene block, each V is independently a vinyl aromatic block, each d is a polydiene end cap, α is a coupling moiety, and x is an integer from 2 to 10.

15 Claims, No Drawings

POLYMER-MODIFIED ASPHALT COMPOSITIONS

This application is a continuation application of U.S. Non-Provisional application Ser. No. 12/596,649 Oct. 19, 2009 (§371 date—Jan. 11, 2010), which claims priority from International Application Serial No. PCT/US08/05123, filed on Apr. 18, 2008 and U.S. Provisional Patent Application Ser. No. 60/925,463, filed Apr. 20, 2007, which are incorporated herein by reference.

FIELD OF THE INVENTION

One or more embodiments of this invention relate to the use of diene end-capped polymers in the production of modified-asphalt compositions.

BACKGROUND OF THE INVENTION

Asphalt paving compositions, which include a mixture of asphalt binder and aggregate, have long been employed in the manufacture of pavements. The asphalt binder compositions often included polymeric additives and are therefore often referred to as modified or polymer-modified asphalt binder compositions. The presence of polymeric materials is believed to improve the behavior of the pavements, particularly at extreme temperatures.

While elastomeric polymers having low crystallinity are often advantageously employed, the presence of high Tg polymers also produces benefit. Therefore, particularly useful polymers include block copolymers including low Tg amorphous segments or blocks and high Tg amorphous segments or blocks. For example, block copolymers including a block of styrene and a block of butadiene may be used including polymers such as block styrene-butadiene-styrene (SBS).

In manufacturing the modified asphalt binder compositions, polymer is introduced with molten asphalt. Under sufficient conditions of mixing and/or shear, the polymer is dissolved and/or dispersed into the molten-asphalt composition. It is desirable to uniformly disperse the polymer throughout the composition.

It has been discovered that certain polymers, such as styrene-butadiene-styrene block polymers do not disperse as efficiently into the molten asphalt. This is especially true with high molecular weight polymers. As a result, greater energy requirements and time are required to achieve a desirable dispersion of the polymer within the asphalt.

Conventional approaches to improving the dispersibility of the polymers into the molten asphalt includes the use of lower molecular weight polymers, which generally disperse more readily into the asphalt composition. Unfortunately, by using lower molecular weight polymers, the advantages sought by the use of a higher molecular weight polymers cannot be fully achieved. For example, certain binder and/or pavement performance ratings cannot be achieved with low molecular weight polymers.

Thus, there is a need to improve the dispersibility of polymers, particularly polymers including high Tg blocks, without deleteriously sacrificing performance attributes that are advantageously achieved with higher molecular weight polymers.

SUMMARY OF THE INVENTION

One or more embodiments of the present invention provides a modified-asphalt composition prepared by introducing a diene end-capped block copolymer with a molten asphalt composition, where the block copolymer is defined by the formula $$\alpha\text{-(D-V-d)}_x$$

where each D is independently a polydiene block, each V is independently a vinyl aromatic block, each d is a polydiene end cap, α is a coupling moiety, and x is an integer from 2 to 10.

One or more embodiments of the present invention also provides a copolymer for forming a modified asphalt composition, the copolymer comprising a block copolymer defined by the formula $$\alpha\text{-(D-V-d)}_x$$

where each D is independently a polydiene block, each V is independently a vinyl aromatic block, each d is a polydiene end cap, α is a coupling moiety, and x is an integer from 2 to 10.

One or more embodiments of the present invention also provides a method for forming a modified asphalt composition, the method comprising introducing a diene end-capped block copolymer with a molten asphalt composition, where the block copolymer is defined by the formula $$\alpha\text{-(D-V-d)}_x$$

where each D is independently a polydiene block, each V is independently a vinyl aromatic block, each d is a polydiene end cap, α is a coupling moiety, and x is an integer from 2 to 6.

One or more embodiments of the present invention also provides a pavement prepared by depositing onto a surface an asphalt paving composition prepared with a modified-asphalt composition prepared by introducing a diene end-capped block copolymer with a molten asphalt composition, where the block copolymer is defined by the formula $$\alpha\text{-(D-V-d)}_x$$

where each D is independently a polydiene block, each V is independently a vinyl aromatic block, each d is a polydiene end cap, α is a coupling moiety, and x is an integer from 2 to 10.

DETAILED DESCRIPTION OF ILLUSTRATIVE EMBODIMENTS

In one or more embodiments, an asphalt-modified composition is prepared by introducing a diene end-capped block copolymer with a molten asphalt composition. The diene end-capped block copolymer may be simply referred to as the "end-capped copolymer." It has been unexpectedly discovered that the diene end-capped block copolymers of one or more embodiments can be advantageously mixed with molten asphalt. As a result, modified asphalt compositions can be efficiently prepared.

In one or more embodiments, the diene end-capped block copolymers can be defined by the formula $$\alpha\text{-(D-V-d)}_x$$

where each D is independently a polydiene block, each V is independently a vinyl aromatic block, each d is a polydiene end cap, α is a coupling moiety, and x is an integer from 2 to 10.

In one or more embodiments, each d of the block copolymer, each of which may be independently defined, includes at least 10, in other embodiments at least 40, in other embodiments at least 60, and in other embodiments at least 80, in other embodiments at least 100, and in other embodiments at least 120 mer units deriving from the polymerization of conjugated diene monomer. In these or other embodiments, each d, which may be independently defined, includes less than 500, in other embodiments less than 350, in other embodiments less than 250, in other embodiments less than 200, in other embodiments less than 180, in other embodiments less than 160, and in other embodiments less than 120 mer units deriving from the polymerization of conjugated diene monomer.

In one or more embodiments, each D of the block copolymer, each of which may be independently defined, includes at least 400, in other embodiments at least 500, in other embodiments at least 650, and in other embodiments at least 700 mer units deriving from the polymerization of conjugated diene monomer. In these or other embodiments, each D, which may be independently defined, includes less than 1,200, in other embodiments less than 1,100, in other embodiments less than 950, and in other embodiments less than 850 mer units deriving from the polymerization of conjugated diene monomer.

In one or more embodiments, each V of the block copolymer, each of which may be independently defined, includes at least 100, in other embodiments at least 120, in other embodiments at least 145, in other embodiments at least 160, in other embodiments at least 180, and in other embodiments at least 200 mer units deriving from the polymerization of vinyl aromatic monomer. In these or other embodiments, each V, which may be independently defined, includes less than 500, in other embodiments less than 400, in other embodiments less than 300, in other embodiments less than 250, and in other embodiments less than 200 mer units deriving from the polymerization of vinyl aromatic monomer.

In one or more embodiments, the ratio of the d mer units to the V mer units is at least 0.2:1, in other embodiments at least 0.3:1, in other embodiments at least 0.4:1, in other embodiments at least 0.45:1, in other embodiments at least 0.52:1, and in other embodiments at least 0.55:1. In these or other embodiments, the ratio of the d mer units to the V mer units is less than 2.5:1, in other embodiments less than 1.4:1, in other embodiments less than 1:1, in other embodiments less than 0.9:1, and in other embodiments less than 0.8:1. In one or more embodiments, the ratio of the d mer units to the V mer units from about 1:0.4 to about 1:5, and in other embodiments from about 1:0.7 to about 1:3.

In one or more embodiments, the ratio of the V mer units to the sum of the D and d mer units may be at least 0.12:1, in other embodiments at least 0.14:1, in other embodiments at least 0.16:1, and in other embodiments at least 0.17:1. In these or other embodiments, the ratio of the V mer units to the sum of the D and d mer units may be less than 1.2:1, in other embodiments less than 1.0:1, in other embodiments less than 0.5:1, in other embodiments 0.27:1, in other embodiments less than 0.25:1, in other embodiments less than 0.22:1, and in other embodiments less than 0.20:1. In one or more embodiments, the ratio of the V mer units to the sum of the D and the d mer units may be from about 0.15:1 to about 0.23:1, and in other embodiments from about 0.17:1 to about 0.19:1.

In one or more embodiments, the amount of V mer units present with respect to the sum of the D and the d mer units may be represented as the mole percent of bound V (e.g. bound styrene content). In one or more embodiments, the mole percent of bound V is at least 12 mole %, in other embodiments at least 14 mole %, in other embodiments at least 16 mole %, and in other embodiments at least 17 mole % based on the total moles of mer units within the copolymer. In these or other embodiments, the mole percent of bound V is less than 70 mole %, in other embodiments less than 55 mole %, in other embodiments less than 40 mole %, in other embodiments less than 37 mole %, in other embodiments less than 35 mole %, in other embodiments less than 30 mole %, and in other embodiments less than 27 mole % based on the total moles of mer units within the copolymer.

In one or more embodiments, the polydiene block defined by D and/or the polydiene block defined by d is characterized by a vinyl content of at least 15%, in other embodiments at least 18%, in other embodiments at least 20%, and in other embodiments at least 22%. In these or other embodiments, the polydiene block represented by d and/or D is characterized by a vinyl content of less than 40%, in other embodiments less than 35%, in other embodiments less than 32%, and in other embodiments less than 8%.

In one or more embodiments, x is 2. In other embodiments x is 4. In other embodiments x is 6, and in other embodiments x is 9. In other embodiments, x is an integer from at least 3, and in other embodiments at least 4. In these or other embodiments, x is an integer from 2 to about 20, or in other embodiments from about 2 to about 15.

In one or more embodiments, the mer units deriving from conjugated diene monomer may derive from 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized. In one or more embodiments, the mer units deriving from vinyl aromatic monomer may derive from monomer such as styrene, and methyl styrene.

In those embodiments where x is 2, the diene end-capped block copolymer is a linear molecule. In these or other embodiments, this linear block copolymer may be characterized by a peak molecular weight ($M_p$) of at least 40 kg/mole, in other embodiments at least 55 kg/mole, in other embodiments at least 70 kg/mole, in other embodiments at least 90 kg/mole, in other embodiments at least 100 kg/mole, and in other embodiments at least 110 kg/mole as determined by GPC using polystyrene standards. In these or other embodiments, particularly where the block copolymer is a linear molecule, the block copolymer may be characterized by a peak molecular weight of less than 230 kg/mole, in other embodiments less than 200 kg/mole, in other embodiments less than 170 kg/mole, in other embodiments less than 150 kg/mole, and in other embodiments less than 130 kg/mole. In these or other embodiments, the linear molecule may be characterized by a molecular weight distribution of from about 0.8 to about 2, in other embodiments from about 0.9 to about 1.6, and in other embodiments from about 1.1 to about 1.4.

Where x is 3, 4, and/or 6, the block copolymer is a star-branched molecule. In these or other embodiments, the star-branched block copolymer molecule may be characterized by a peak molecular weight of at least 150, in other embodiments at least 200, in other embodiments at least 225, and in other embodiments at least 250 kg/mole. In these or other embodiments, the star-branched block copolymer may be characterized by a peak molecular weight of less than 700, in other embodiments less than 500, in other embodiments less than 400, and in other embodiments less than 300 kg/mole. In these or other embodiments, the star-branched block copolymer may be characterized by a molecular weight distribution of from about 1.5 to about 4.0, and in other embodiments from about 1.8 to about 2.7.

In one or more embodiments, the size of the diene end-capped block copolymer may be described with reference to the arm of the diene end-capped block copolymer. For purposes of this specification, the arm of the diene end-capped block copolymer is the D-V-d segment of the diene end-capped block copolymer. To the extent that the diene end-capped block copolymer may be prepared via a coupling reactions (which will be described in greater detail herein below), the arm (D-V-d) may be equivalent (or substantially equivalent) to the base molecular weight of the polymer (D-V-d) prior to coupling. In one or more embodiments, the Mp (peak molecular weight) of the of the base polymer or arm is at least about 45 kg/mole, in other embodiments at least about 50 kg/mole, in other embodiments at least about 55 kg/mole, and in other embodiments at least about 60 kg/mole. In these or other embodiments, the Mp (peak molecular weight) of the of the base polymer or arm is less than about 100 kg/mole, in other embodiments less than about 90 kg/mole, in other embodiments less than about 80 kg/mole, and in other embodiments less than about 75 kg/mole In one or more embodiments, the diene end-capped block copolymer is introduced with the molten asphalt within a mixture with a distinct polymeric species (i.e. a polymer distinct from the diene end-capped block copolymer). Where the diene end-capped block copolymer is a linear molecule (which may be referred to as a coupled block copolymer), the mixture that is introduced with the molten asphalt may be characterized by a melt index (ASTM D-1238, 2.16 kg @ 190° C.) of at least 1, in other embodiments at least 3, in other embodiments at least 5, and in other embodiments at least 7 dg/min. In these or other embodiments, the mixture including the linear end-capped block copolymer may be characterized by a melt index of less than 20, in other embodiments less than 15, in other embodiments less than 12, and in other embodiments less than 10 dg/min.

In one or more embodiments, the distinct polymeric species that is included within the mixture with the linear diene end-capped block copolymer is a block copolymer defined by the formula d-V-D, where D, V, and d are defined above. In these or other embodiments, the mole ratio of the linear end-capped block copolymer and the distinct polymer defined by the formula d-V-D is at least 1:0.8, in other embodiments at least 1:1, and in other embodiments at least 1:1.5. In these or other embodiments, the mole ratio of the linear end-capped block copolymer to the distinct polymer d-V-D is less than 1:4, in other embodiments less than 1:3, and in other embodiments less than 1:2.5.

In one or more embodiments, where the diene end-capped block copolymer is a star-branched block copolymer, and the star-branched block copolymer is introduced to the molten asphalt within a mixture together with a distinct polymer. In one or more embodiments, the mixture may be characterized by a melt index of less than 2, in other embodiments less than 1, and in other embodiments less than 0.7 dg/min.

In one or more embodiments, the star-branched block copolymer is introduced with the molten asphalt in a mixture together with a distinct polymeric species defined by the formula d-V-D, where D, V, and d are defined above. In these or other embodiments, the mole ratio of the diene end-capped branched block copolymer to the distinct d-V-D is at least 0.5:1, in other embodiments at least 0.7:1, and in other embodiments at least 0.9:1. In these or other embodiments, the mole ratio of the diene end-capped branched block copolymer to the distinct d-V-D polymer is less than 9.5:1, in other embodiments less than 5:1, in other embodiments less than 2.5:1, in other embodiments less than 2:1, and in other embodiments less than 1.8:1.

In one or more embodiments, the block copolymers employed in the present invention can be synthesized by employing anionic polymerization techniques. In one or more embodiments, living polymers include anionically polymerized polymers (i.e., polymers prepared by anionic polymerization techniques). Anionically-polymerized living polymers may be formed by reacting anionic initiators with certain unsaturated monomers to propagate a polymeric structure. Or, in other embodiments, other monomers such as epoxides or cyclic siloxanes, may be polymerized by anionic polymerization. Throughout formation and propagation of the polymer, the polymeric structure may be anionic and "living." A new batch of monomer subsequently added to the reaction can add to the living ends of the existing chains and increase the degree of polymerization. A living polymer, therefore, includes a polymeric segment having a living or reactive end. Anionic polymerization is further described in George Odian, *Principles of Polymerization*, ch. 5 ($3^{rd}$ Ed. 1991), or Panek, 94 J. Am. Chem. Soc., 8768 (1972), which are incorporated herein by reference.

Monomers that can be employed in preparing an anionically polymerized living polymer include any monomer capable of being polymerized according to anionic polymerization techniques. These monomers include those that lead to the formation of elastomeric homopolymers or copolymers. Suitable monomers include, without limitation, conjugated $C_4$-$C_{12}$ dienes, $C_8$-$C_{18}$ monovinyl aromatic monomers, and $C_6$-$C_{20}$ trienes. Examples of conjugated diene monomers include, without limitation, 1,3-butadiene, isoprene, 1,3-pentadiene, 2,3-dimethyl-1,3-butadiene, and 1,3-hexadiene. A non-limiting example of trienes includes myrcene. Aromatic vinyl monomers include, without limitation, styrene, $\alpha$-methyl styrene, p-methylstyrene, and vinylnaphthalene. When preparing elastomeric copolymers, such as those containing conjugated diene monomers and aromatic vinyl monomers, the conjugated diene monomers and aromatic vinyl monomers are normally used at a ratio of 95:5 to 50:50, and preferably 95:5 to 65:35.

Any anionic initiator can be employed to initiate the formation and propagation of the living polymers. Exemplary anionic initiators include, but are not limited to, alkyl lithium initiators such as n-butyl lithium, arenyllithium initiators, arenylsodium initiators, aminoalkyllithiums, and alkyl tin lithiums. Other useful initiators include N-lithiohexamethyleneimide, N-lithiopyrrolidinide, and N-lithiododecamethyleneimide as well as organolithium compounds such as the tri-alkyl lithium adducts of substituted aldimines and substituted ketimines, and N-lithio salts of substituted secondary amines. Still others include alkylthioacetals (e.g., dithianes). Exemplary initiators are also described in the following U.S. Pat. Nos. 5,332,810, 5,329,005, 5,578,542, 5,393,721, 5,698, 646, 5,491,230, 5,521,309, 5,496,940, 5,574,109, 5,786,441, and International Publication Nos. WO 2004/020475 and WO 2004/041870, which are incorporated herein by reference.

The amount of initiator employed in conducting anionic polymerizations can vary widely based upon the desired polymer characteristics. In one or more embodiments, from about 0.1 to about 100, and optionally from about 0.33 to about 10 mmol of lithium per 100 g of monomer is employed.

Anionic polymerizations are typically conducted in a polar solvent such as tetrahydrofuran (THF) or a non-polar hydrocarbon such as the various cyclic and acyclic hexanes, heptanes, octanes, pentanes, their alkylated derivatives, and mixtures thereof, as well as benzene.

In order to promote randomization in copolymerization and to control vinyl content, a polar coordinator may be added to the polymerization ingredients. Amounts range between 0 and 90 or more equivalents per equivalent of lithium. The amount depends on the amount of vinyl desired, the level of styrene employed and the temperature of the polymerization, as well as the nature of the specific polar coordinator (modifier) employed. Suitable polymerization modifiers include, for example, ethers or amines to provide the desired microstructure and randomization of the comonomer units.

Compounds useful as polar coordinators include those having an oxygen or nitrogen heteroatom and a non-bonded pair of electrons. Examples include dialkyl ethers of mono and oligo alkylene glycols; "crown" ethers; tertiary amines such as tetramethylethylene diamine (TMEDA); linear THF oligomers; and the like. Specific examples of compounds useful as polar coordinators include tetrahydrofuran (THF), linear and cyclic oligomeric oxolanyl alkanes such as 2,2-bis (2'-tetrahydrofuryl) propane, di-piperidyl ethane, dipiperidyl methane, hexamethylphosphoramide, N—N'-dimethylpiperazine, diazabicyclooctane, dimethyl ether, diethyl ether, tributylamine and the like. The linear and cyclic oligomeric oxolanyl alkane modifiers are described in U.S. Pat. No. 4,429,091, incorporated herein by reference.

Anionically polymerized living polymers can be prepared by either batch or continuous methods. A batch polymerization is begun by charging a blend of monomer(s) and normal alkane solvent to a suitable reaction vessel, followed by the addition of the polar coordinator (if employed) and an initiator compound. The reactants are heated to a temperature of from about 20 to about 130° C. and the polymerization is allowed to proceed for from about 0.1 to about 24 hours. This reaction produces a reactive polymer having a reactive or living end. Preferably, at least about 30% of the polymer molecules contain a living end. More preferably, at least about 50% of the polymer molecules contain a living end. Even more preferably, at least about 80% contain a living end.

After formation of the functional polymer, a processing aid and other optional additives such as oil can be added to the polymer cement. The functional polymer and other optional ingredients may then be isolated from the solvent and optionally dried. Conventional procedures for desolventization and drying may be employed. In one embodiment, the functional polymer may be isolated from the solvent by steam desolventization or hot water coagulation of the solvent followed by filtration. Residual solvent may be removed by using conventional drying techniques such as oven drying or direct drying. Alternatively, the cement may be directly dried.

As is known in the art of anionic polymerization, block copolymers can be synthesized by sequentially polymerizing distinct monomer. For example, conjugated diene monomer can first be polymerized to form the d block, and then vinyl aromatic monomer can be added to the solution containing the live polymer to thereby form the V block, and then additional conjugated diene monomer can be added to the solution containing the live polymer to form the D block. This living polymer, which can be represented by d-V-D°, where d, V, and D are defined above, can then be coupled with a coupling agent. The residue of this coupling agent forms the α moiety.

Useful coupling agents include those compounds that can react with and serve to couple two or more living polymers together. In one or more embodiments, useful coupling agents include monoesters. Useful monoesters include those defined by the formula

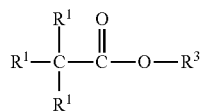

where $R^1$ is a mono-valent organic group and $R^3$ is a mono-valent organic group.

In one or more embodiments, mono-valent organic groups may include hydrocarbyl groups such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups. These hydrocarbyl groups may contain heteroatoms such as, but not limited to, nitrogen, oxygen, boron, silicon, sulfur, tin, and phosphorus atoms. In one or more embodiments, an ester group or a group that includes an ester linkage is included in one or more of the mono-valent organic groups. As those skilled in the art appreciate, where the mono-valent organic group includes one or more ester linkages, the ester molecule may be a diester, triester, or other multi-ester.

In one or more embodiments, useful esters include those defined by the compound

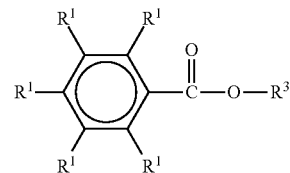

where R1 is a mono-valent organic group as defined above, and R3 is a monovalent organic group as defined above.

Particular examples of monoesters include butyl benzoate. Particular examples of diesters include dioctyl terphthalate. Particular examples of triesters include trioctyl trimellitate.

Useful coupling agents include monoesters such as butyl benzoate, diesters such as dioctyl terephthalate, or triesters such as trioctyl trimellitate. As is known in the art, the functionality of the coupling agent will dictate whether the block copolymer is a linear or star-branched molecule.

In one or more embodiments, the coupling agent may include metal halides or metalloid halides such as those that may be selected from the group consisting of compounds expressed by the formula (1) $R^1{}_nM^1X_{4-n}$, the general formula (2) $M^1X_4$, and the general formula (3) $M^2X_3$, where $R^1$ in the general formula (1) is the same or different and represents a mono-valent organic group with carbon number of 1 to about 20, $M^1$ in the general formulas (1) and (2) represents a tin atom, silicon atom, or germanium atom, $M^2$ in the general formula (3) represents a phosphorous atom, X in the general formulas (1)-(3) represents a halogen atom, and n in the general formula (1) represents an integer of from 0 to about 3.

Exemplary compounds expressed by the general formula (1) may include halogenated organic metal compounds, and the compounds expressed by the general formulas (2) and (3) may include halogenated metal compounds.

In the case where $M^1$ represents a tin atom, the compounds expressed by the general formula (1) can be, for example, triphenyltin chloride, tributyltin chloride, triisopropyltin chloride, trihexyltin chloride, trioctyltin chloride, diphenyltin dichloride, dibutyltin dichloride, dihexyltin dichloride, dioctyltin dichloride, phenyltin trichloride, butyltin trichloride, octyltin trichloride and the like. Furthermore, tin tetrachloride, tin tetrabromide and the like can be exemplified as the compounds expressed by general formula (2).

In the case where $M^1$ represents a silicon atom, the compounds expressed by the general formula (1) can be, for example, triphenylchlorosilane, trihexylchlorosilane, trioctylchlorosilane, tributylchlorosilane, trimethylchlorosilane, diphenyldichlorosilane, dihexyldichlorosilane, dioctyldichlorosilane, dibutyldichlorosilane, dimethyldichlorosilane, methyltrichlorosilane, phenyltrichlorosilane, hexyltrichlorosilane, octyltrichlorosilane, butyltrichlorosilane, methyltrichlorosilane and the like. Furthermore, silicon tetrachloride, silicon tetrabromide and the like can be exemplified as the compounds expressed by the general formula (2). In the case where $M^1$ represents a germanium atom, the compounds expressed by the general formula (1) can be, for example, triphenylgermanium chloride, dibutylgermanium dichloride, diphenylgermanium dichloride, butylgermanium trichloride and the like. Furthermore, germanium tetrachloride, germanium tetrabromide and the like can be exemplified as the compounds expressed by the general formula (2). Phosphorous trichloride, phosphorous tribromide and the like can be exemplified as the compounds expressed by the general formula (3). In one or more embodiments, mixtures of metal halides and/or metalloid halides can be used.

In one or more embodiments, a derives from the oligomerization of divinylbenzene with living polymer chains. According to theoretical calculations, this synthesis will yield a star polymer including 9 branches or arms. As a result, the macromolecular structure of the block copolymer is a star branched polymer with 9 arms or branches.

In one or more embodiments, only portion of the d-V-D° living polymers are coupled. After a partial coupling, the solution of living polymer and coupling polymer can be quenched, and isolation of the polymeric species results in a polymer mixture including coupled polymer and uncoupled d-V-D polymer. This mixture can then be introduced with the molten asphalt to form the modified asphalt compositions employed in the present invention.

In one or more embodiments, particularly where the coupling of the d-V-D° living polymers results in a linear di-coupled block copolymer, the living polymer solution may be coupled from about 10 to about 70%, in other embodiments from about 20 to about 40%, and in other embodiments from about 25 to about 35%.

In one or more embodiments, particularly where the coupling of the d-V-D° living polymers results in a star-branched block copolymer, the living polymer solution may be coupled from about 50 to about 90%, in other embodiments from about 60 to about 80%, and in other embodiments from about 65 to about 75%. In one or more embodiments, the living polymer solution may be coupled to at least 50%, in other embodiments at least 60%, in other embodiments at least 70%, in other embodiments at least 80%, in other embodiments at least 90%, and in other embodiments at least 95%.

In one or more embodiments, the block copolymers of the present invention can advantageously be prepared in an organic solvent. Suitable solvents include those organic compounds that will not undergo polymerization or incorporation into propagating polymer chains. In one or more embodiments, these organic species are liquid at ambient temperature and pressure. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

One or more embodiments of the present invention provide a method for forming a modified asphalt binder composition that is useful for preparing asphalt paving compositions. In one or more embodiments, the modified asphalt binder composition may be formed by introducing and mixing an asphalt binder, and a polymer. The modified asphalt binder composition may be combined with aggregate to form an asphalt paving composition. In particular embodiments, the asphalt paving composition can be formed into pavements.

One or more embodiments, the asphalt binder compositions of the present invention are prepared by adding phosphorus pentasulfide to the asphalt compositions in a manner consistent with co-pending U.S. Ser. No. 11/644,557, which is incorporated herein by reference.

The term "asphalt binder" is used as understood by those skilled in the art and is consistent with the meaning provided by AASHTO M320. Where asphalt binder has been combined with aggregate, the term "asphalt paving composition" is employed. As used within this specification, the terms "asphalt" and "asphalt binder" may be used synonymously. The asphalt binder material may be derived from any asphalt source, such as natural asphalt, rock asphalt, produced from tar sands, or petroleum asphalt obtained in the process of refining petroleum. The asphalt binder may be selected from those currently graded by AASHTO M320 and ASTM D-6373, including Performance Graded Asphalt Binders. In other embodiments, asphalt binders may include a blend of various asphalts not meeting any specific grade definition. This includes air-blown asphalt, vacuum-distilled asphalt, steam-distilled asphalt, cutback asphalt or roofing asphalt. Alternatively, gilsonite, natural or synthetic, used alone or mixed with petroleum asphalt, may be selected. Synthetic asphalt mixtures suitable for use in the present invention are described, for example, in U.S. Pat. No. 4,437,896. In one or more embodiments, asphalt includes petroleum derived asphalt and asphaltic residual. These compositions may include asphaltenes, resins, cyclics, and saturates. The percentage of these constituents in the overall asphalt binder composition may vary based on the source of the asphalt.

Asphaltenes include black amorphous solids containing, in addition to carbon and hydrogen, some nitrogen, sulfur, and oxygen. Trace elements such as nickel and vanadium may also be present. Asphaltenes are generally considered as highly polar aromatic materials of a number average molecular weight of about 2000 to about 5000 g/mol, and may constitute about 5 to about 25% of the weight of asphalt.

Resins (polar aromatics) include dark-colored, solid and semi-solid, very adhesive fractions of relatively high molecular weight present in the maltenes. They may include the dispersing agents of peptizers for the asphaltenes, and the proportion of resins to asphaltenes governs, to a degree, the sol- or gel-type character of asphalts. Resins separated from bitumens may have a number average molecular weight of about 0.8 to about 2 kg/mol but there is a wide molecular distribution. This component may constitute about 15 to about 25% of the weight of asphalts.

Cyclics (naphthene aromatics) include the compounds of lowest molecular weight in bitumens and represent the major portion of the dispersion medium for the peptized asphaltenes. They may constitute about 45 to about 60% by weight of the total asphalt binder, and may be dark viscous liquids. They may include compounds with aromatic and naphthenic aromatic nuclei with side chain constituents and may have molecular weights of 0.5 to about 9 kg/mol.

Saturates include predominantly the straight- and branched-chain aliphatic hydrocarbons present in bitumens, together with alkyl naphthenes and some alkyl aromatics. The average molecular weight range may be approximately similar to that of the cyclics, and the components may include the waxy and non-waxy saturates. This fraction may from about 5 to about 20% of the weight of asphalts.

In these or other embodiments, asphalt binders may include bitumens that occur in nature or may be obtained in petroleum processing. Asphalts may contain very high molecular weight hydrocarbons called asphaltenes, which may be soluble in carbon disulfide, pyridine, aromatic hydrocarbons, chlorinated hydrocarbons, and THF. Asphalts or bituminous materials may be solids, semi-solids or liquids.

In one or more embodiments, the asphalt binders, prior to modification (i.e., prior to combination with unsaturated polymer or $P_2S_5$), may be characterized by a PG rating of at least PG 64-22, in other embodiments at least PG 52-28, and in other embodiments at least PG 52-34. It should be noted that each of these exemplary asphalt binders have a temperature performance range of 86° C. While the selection of these asphalt binders may be advantageous desirable and certain embodiments, practice of the present invention advantageously allows for the use of a base asphalt binder with a lower temperature range because this lower temperature range can be upgraded through practice of the present invention. For example, a PG 64-16, PG 58-22, or PG 52-28 can be modified to increase its temperature range. As those skilled in the art appreciate, PG rating refers to Super Pave (Superior Performing Pavements) Performance Graded (PG) binder specifications as developed in the United States through research funded by the Association of American Highway and Transportation Officials (AASHTO M320).

The modified asphalt binder compositions of this invention may also include those other ingredients or constituents that are commonly employed in the industry. For example, the compositions may include anti-stripping compounds.

In other embodiments, curing agents can optionally be added to the modified asphalt binder compositions of this embodiment. Curing agents may include phenolic resins and elemental sulfur. One example is a bismaleimide curing agent. Conventional amounts may be employed in practicing this invention. In one or more embodiments, the need for a curing agent, particularly sulfur, is eliminated. In other words, asphalt binder compositions of the present invention can be prepared without the addition of a curing agent and/or a sulfur-containing curative other than the phosphorus pentasulfide.

The asphalt binder compositions of the present invention may include from about 0.1 to about 10 parts by weight, in other embodiments from about 0.2 to about 6 parts by weight, and in other embodiments from about 0.5 to about 4 parts by weight polymer per 100 parts by weight asphalt binder. In these or other embodiments, the asphalt binder compositions of the present invention may include less than 5 parts by weight, in other embodiments less than 4 parts by weight, in other embodiments less than 3 parts by weight, in other embodiments less than 2.5 parts by weight, in other embodiments less than 2 parts by weight, in other embodiments less than 1.8 parts by weight, in other embodiments less than 1.5 parts by weight polymer per 100 parts by weight asphalt binder. In these or other embodiments, the asphalt binder compositions include at least 0.1 parts by weight, in other embodiments at least 0.5 parts by weight, in other embodiments at least 0.7 parts by weight, in other embodiments at least 1.0 parts by weight, and in other embodiments at least 1.2 parts by weight polymer per 100 parts by weight asphalt binder.

In those embodiments where a curative is employed, the asphalt compositions of this invention may include from about 0.1 to about 10, in other embodiments from about 0.2 to about 6, and in other embodiments from about 0.5 to about 4 parts by weight curative per 100 parts by weight asphalt. In these or other embodiments, the formation of the asphalt binder compositions of the present invention may employ less than 3 parts, in other embodiments less than 1 parts, in other embodiments less than 0.5 parts, in other embodiments less than 0.25 parts, in other embodiments less than 0.1 parts, and in other embodiments less than 0.01 parts by weight curative (e.g., free sulfur or elemental sulfur) per 100 parts by weight asphalt binder.

In one or more embodiments, the modified asphalt binder compositions of this invention can be prepared by introducing asphalt binder with a desired amount of polymer (e.g., unsaturated polymer) at a desired temperature. In one embodiment, the polymer may be added to molten asphalt binder at temperatures greater than about 120° C., or in other embodiments from about 140° C. to about 210° C. In one or more embodiments, the polymer and asphalt may be mixed or blended after or during introduction of the same. Mixing may then be continued for about 25 to about 400 minutes at a temperature of about 145° C. to about 205° C. (or in other embodiments from about 160° C. to about 193° C.). In one or more embodiments, the mixture of the asphalt binder and polymer may be sheared in order to disperse the polymer quickly into the asphalt. Shearing may be accomplished, for example, within a high shear mill such as that produced by Siefer. In other embodiments, simple low shear mixing may be employed where time is less important.

The modified asphalt binder compositions prepared according to the present invention may be employed to prepare asphalt paving compositions. These paving compositions may include the modified asphalt binder, aggregate, and other optional constituents that can be added into paving compositions as is known in the art. Conventional aggregate that is used in the paving industry can be utilized in the practice of this embodiment. Aggregate may include rocks, stones, slags, crushed stone, gravel, sand, silica, or mixtures of one or more thereof. Specific examples of aggregates include marble, limestone, basalt, dolomite, sandstone, granite, quartzite, steel slag, and mixture of two or more thereof.

Aggregate typically has a wide distribution of particle sizes ranging from sub-micron particles (e.g., dust) to golf-ball sized masses as large as 63 mm in diameter. The best particle size distribution varies from application to application.

In addition to the aggregate and the modified asphalt binder, the paving compositions of the present invention may also include other constituents or ingredients that may be used in preparing asphalt paving compositions. These additional constituents or ingredients may include fibers, release agents, and fillers. Other examples include calcium hydroxide, sanders dust, cellulose fibers, propylene-based fibers, and mixtures of two or more thereof.

The asphalt paving compositions of the present invention can be prepared by using standard equipment and procedures. In one or more embodiments, the aggregate is mixed with the modified asphalt binder to attain an essentially homogeneous asphalt paving. For instance, the aggregate can be mixed with the modified asphalt binder to produce asphalt paving composition on a continuous basis in a standard mixer.

When preparing an asphalt paving composition, generally from about 1 weight percent to about 10 weight percent of the modified asphalt and from about 90 weight percent to about 99 weight percent aggregate (based on the total weight of the asphalt paving composition) is mixed. In other embodiments, the paving compositions include from about 2 to about 8 weight percent of the modified asphalt.

The asphalt paving compositions prepared according to the present invention are particularly advantageous for preparing pavements. As is known in the art, the pavement can be prepared by depositing the asphalt paving composing onto a surface. These pavements may include, but are not limited to, roadways, airport runways, walkways, trails, golf cart paths, pond liner, landfill covers, and bridge decks. Also, the modified asphalt binder compositions of the present invention are advantageous for making other compositions besides the pavement compositions. For example, the modified asphalt compositions may be useful in roofing applications.

In order to demonstrate the practice of the present invention, the following examples have been prepared and tested. The examples should not, however, be viewed as limiting the scope of the invention. The claims will serve to define the invention.

EXAMPLES

Samples 1-3 & Comparative 1-2

Two polymers in accordance with the present invention we prepared and dissolved in asphalt according to a standardized test procedure. Two comparative polymers that were commercially obtained were likewise dissolved. The ease of dissolvability in the asphalt was recorded.

The characteristics of the polymers used are provided in Table I together with the results of the test. Comparative I was a radial polymer, which refers to the fact that the polymer had at least 3 arms or branches, and each arm was believed to include a styrene-butadiene block copolymer. Sample I was likewise a radial polymer and was prepared by coupling base polymer that was a styrene-butadiene block copolymer including diene end cap. Comparative I was determined to include about 30% bound styrene, and Sample I was synthesized to include about the same amount of bound styrene.

Comparative II was a linear polymer that was believed to include a styrene-butadiene-styrene block copolymer. Sample II was likewise a linear polymer that was prepared by di-coupling base polymer that was a styrene-butadiene block copolymer including diene end cap. Comparative I was determined to include about 30% bound styrene, and Sample I was synthesized to include about the same amount of bound styrene.

TABLE I

| | Examples | | | | |
| --- | --- | --- | --- | --- | --- |
| | Comparative 1 | Sample 1 | Comparative 2 | Sample 2 | Sample 3 |
| Structure Type | Radial | Radial | Linear | Linear | Linear |
| Mp Base (kg/mole) | 75 | 75 | 50 | 62 | 67 |
| Mp cpld (kg/mole) | 228 | 264 | 93 | 112 | — |

TABLE I-continued

| | Examples | | | | |
| --- | --- | --- | --- | --- | --- |
| | Comparative 1 | Sample 1 | Comparative 2 | Sample 2 | Sample 3 |
| Coupled (%) | 89.0 | 77.0 | 25.0 | 27.0 | 27.0 |
| vinyl (%) | 16.5 | 24.0 | 13.4 | 24.0 | 24.0 |
| 30-Minute Melt Test | 0 | 54 | 7 | 14.5 | 69.2 |

Each polymer, which was in pellet or crumb form, was tested according to the following procedure. To a quart can container was added 500 grams of asphalt binder preheated to 163° C. The asphalt binder was obtained from BP (Whiting, Ind.) and had a PG rating of 64-22 per AASHTO M320. Using a quart can heater, the asphalt binder was heated to 190° C. The asphalt binder was stirred by using a three-paddle agitator positioned about one-half inch above the bottom of the can and operating at sufficient r.p.m. to create a vortex in the asphalt. A portion of each polymer was passed through a #4 (0.187 inch) sieve screen and a 20 gram sample was collected. The screened polymer was slowly added to the stirred asphalt sample at a rate of about 20 gram per minute. Stirring continued for 30 minutes at 190° C., during which time a scraping tool was employed to break up clumps of polymer.

After 30 minutes of mixing, the mixture of asphalt binder and polymer are passed through a pre-weighed 20-mesh sieve screen. The screen (with residue of the mixture) is placed onto another quart can and placed into an oven at 163° C. for one hour. After cooling for 15 minutes, the screen and residue of the mixture are weighed. For purposes of this analysis, the weight of the residue remaining on the screen is assumed to be undissolved polymer, which is reported in Table I as a percentage of the original 20 gram sample as the 30-minute melt test.

The Mp of the sample was determined using GPC analysis with polystyrene standards. As noted within this specification, the Mp represent the peak average molecular weight. As is known in the art, a multi-modal polymer or one that is partially coupled, it should be understood that each peak may have its own Mp. The degree of coupling was determined from the area of the peak in question as a function of the overall area under the curve using standard GPC analysis. The vinyl content of the polymer was determined by IR analysis.

As can be determined from the results of the tests, the polymers including diene end caps dissolved in the asphalt to a markedly greater extent than the Comparative polymer, which did not include the diene end cap. Those skilled in the art appreciate that the particle size of the polymer could impact the rate at which the polymer dissolves in the asphalt. While the polymer was screened to establish a maximum particle size, variability within the particle sizes of the polymer could impact the results of this test. But, visual inspection of the polymer particles indicated that there was not a great degree of difference in particle size, and therefore it was concluded that the difference in rate of dissolvability was attributable to the diene end cap.

Samples 4-9

Using anionic polymerization techniques, block styrene-butadiene polymer with a diene end cap was prepared and di-coupled to form a linear polymer (Samples 4-6) or coupled for form radial polymer (Samples 7-9). The characteristics of the polymers prepared are provided in Table II. The polymer samples were likewise analyzed using the 30-minute melt test described above, and the results thereof are provided in Table II.

TABLE II

| | Examples | | | | | |
|---|---|---|---|---|---|---|
| | 4 | 5 | 6 | 7 | 8 | 9 |
| Structure Type (Radial/Linear) | Linear | Linear | Linear | Radial | Radial | Radial |
| Base Weight Ratio | | | | | | |
| Diene End Cap | 0.26 | 0.58 | 1.9 | 0.25 | 0.8 | 1.9 |
| Vinyl Block | 1 | 1 | 1 | 1 | 1 | 1 |
| Diene Block Mp (kg/mole) | 4.2 | 3.9 | 2.6 | 4.3 | 3.7 | 2.6 |
| Base | 66 | 68 | 70 | 71 | 66 | 75 |
| Coupled | 123 | 127 | 131 | 250 | 223 | 255 |
| 30-Minute melt test (%) | 16.2 | 25.6 | 37.0 | 38.7 | 48.4 | 83.2 |

As can be determined from the results of the tests, the size of the diene end cap is directly proportional to the rate at which the polymer (both linear and radial) dissolve in the asphalt. Accordingly, it was unexpectedly discovered that a technologically useful balance of properties could be achieved by varying the length of the diene end cap.

Various modifications and alterations that do not depart from the scope and spirit of this invention will become apparent to those skilled in the art. This invention is not to be duly limited to the illustrative embodiments set forth herein.

What is claimed is:

1. A process for preparing a modified asphalt composition, the process comprising introducing a molten asphalt composition and introducing from about 0.1 to about 10 parts by weight, per 100 parts by weight of the modified asphalt composition, of a linear diene end-capped copolymer defined by the formula:

$$\alpha\text{-(D-V-d)}_x$$

where each D is independently a polydiene block, each V is independently a vinyl aromatic block, each d is a polydiene end cap, α is a coupling moiety, and x is 2;
where α is the residue of a coupling agent defined by the formula $R^1{}_n M^1 X_{4-n}$, where each $R^1$ is a monovalent organic group, $M^1$ is tin, silicon, or germanium, X is a halogen atom, and n is 2; and
where the coupling agent is a dichlorosilane selected from the group consisting of diphenyldichlorosilane, dihexyldichlorosilane, dioctyldichlorosilane, dibutyldichlorosilane, and dimethyldichlorosilane.

2. The process of claim 1, where each d includes from about 10 to about 500 mer units deriving from the polymerization of conjugate diene monomer.

3. The process of claim 2, where each D includes from about 400 to about 1,200 mer units deriving from the polymerization of conjugated diene monomer.

4. The process of claim 3, where each V includes from about 100 to about 500 mer units deriving from the polymerization of vinyl aromatic monomer.

5. The process of claim 4, where d derives from the polymerization of 1,3-butadiene.

6. The process of claim 5, where D derives from the polymerization of 1,3-butadiene.

7. The process of claim 6, where V derives from the polymerization of styrene.

8. The composition of claim 7, where introducing a linear diene end-capped copolymer exhibits a melt index (ASTM D-1238, 2.16 kg @ 190° C.) of less than 2 dg/min.

9. The process of claim 1, further comprising the step of introducing to the molten asphalt from about 0.1 parts to about 10 parts by weight curative, per 100 parts by weight asphalt, where said curative may be phosphorus pentasulfide.

10. The process of claim 1, where the linear block copolymer is characterized by a peak molecular weight of at least 40 kg/mole and less than 230 kg/mole.

11. The process of claim 10, where the linear block copolymer is characterized by a peak molecular weight of at least 90 kg/mole and less than 130 kg/mole.

12. The process of claim 4, where each d includes less than 120 mer units and where each D includes at least 700 mer units.

13. The process of claim 12, where the ratio of the d mer units to the V mer units is from about 1:0.7 to about 1:3.

14. The process of claim 13, where the vinyl content of the D mer units and the d mer units is at least 20% and less than 32%.

15. The process of claim 1, where said step of introducing the linear diene end-capped copolymer takes place at a temperature of from about 140° C. to about 210° C.

* * * * *